Figure 1:
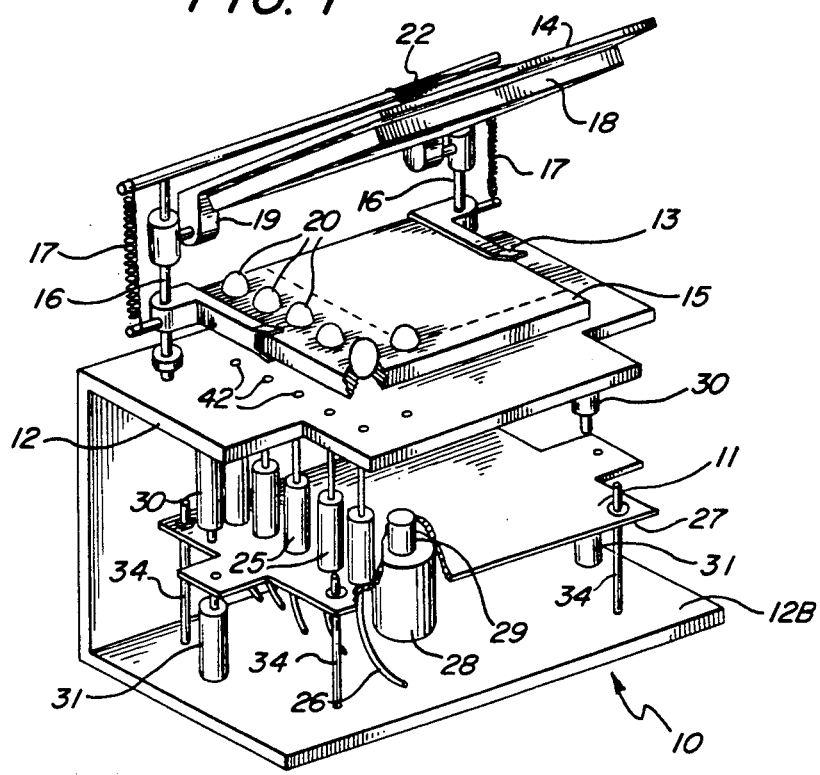

United States Patent [19]
Sheeks et al.

[11] Patent Number: 5,158,038
[45] Date of Patent: Oct. 27, 1992

[54] EGG INJECTION METHOD, APPARATUS AND CARRIER SOLUTION FOR IMPROVING HATCHABILITY AND DISEASE CONTROL

[76] Inventors: Oliver B. Sheeks, 2601 Elsereno Dr., Orange, Calif. 92667; Raymond L. Sheeks, 21131 Chubasco La., Huntington Beach, Calif. 92646

[21] Appl. No.: 533,881

[22] Filed: Jun. 6, 1990

[51] Int. Cl.$^5$ .............................................. A01K 45/00
[52] U.S. Cl. .................................................... 119/6.8
[58] Field of Search .................. 119/6.8; 426/299, 300

[56] References Cited

U.S. PATENT DOCUMENTS

| | | | |
|---|---|---|---|
| 3,377,989 | 4/1968 | Sandhage et al. | 119/6.8 |
| 4,469,047 | 9/1984 | Miller | 119/6.8 |
| 4,593,646 | 6/1986 | Miller et al. | 119/6.8 |
| 4,903,635 | 2/1990 | Hebrank | 119/6.8 |

FOREIGN PATENT DOCUMENTS 570070 2/1959 Canada .................................. 119/6.8

*Primary Examiner*—Robert P. Swiatek
*Attorney, Agent, or Firm*—William L. Chapin

[57] ABSTRACT

An egg injection machine, beneficial injectable formulations for increasing the hatchability of avian hatchery eggs, and an improved method for the control of contamination in the injection process are provided. A novel ethanol-based contamination control carrier solution allows beneficial vaccines, vitamins, nutrients, and trace minerals to be injected into fertile eggs without risk of contamination of the eggs by machine, solution, or egg-to-egg cross-contamination by the injection needle. The invention is useful in both the chicken and turkey hatchery industry for egg injections prior to incubator setting or during transfer to hatch bins. Hatch improvements of +2.29 percent to +5.33 percent are shown for varying conditions. A method for facilitating the injections of virus vaccines is disclosed.

37 Claims, 2 Drawing Sheets

EGG INJECTION METHOD, APPARATUS AND CARRIER SOLUTION FOR IMPROVING HATCHABILITY AND DISEASE CONTROL

FIELD OF THE INVENTION

This invention relates to the field of automatic injections of avian hatchery eggs and to the process of inoculating embryonated eggs with disease control materials and/or nutrients. More particularly, the invention relates to method, apparatus and composition for injecting eggs while reducing the likelihood of contaminating the eggs during the injection process. A disclosure of the present invention was made to the U.S. Patent Office under the Disclosure Document Program on Jun. 6, 1988, Disclosure Document #194412, a copy of which is attached and titled Reference #1.

BACKGROUND OF THE INVENTION

Since 1980, automatic egg injection machines have been useful to the hatchery industry in the inoculation of turkey eggs against mycoplasma melangridis (MM). The method and apparatus have evolved, as exemplified by two related patents; U.S. Pat. No. 4,040,388, Miller and Raymond Sheeks, issued Aug. 9, 1977, and U.S. Pat. No. 4,593,646, Miller and Perry Sheeks, Jun. 10, 1986. Another related patent, U.S. Pat. No. 4,469,047, Miller and Perry Sheeks, issued Sep. 4, 1984, discloses an invention for the injection of formulations through the large or top end of the egg, whereas the two former patents emphasize injection through the small end.

Field experience with the above-cited apparati have shown that injections of gentamicin and streptomycin formulations, trade-named as Garasol and Tylusin, do suppress M and other avian diseases, but with an accompanying one to two percent depression of the hatch. Frequently, unexplained depressions of five to seven percent occur.

More recently, field trials directed by Dr. E. J. Roble of the U.S. Department of Agriculture, Avian Physiology Laboratory, Beltsville, Md., revealed that the depressions sometimes up to eleven percent, were most probably caused by direct contamination by the machine or formulations and by cross contamination between eggs caused by the needles. The degree or hatch depression is directly related to the lack of sanitation of the egg shell, injection solution, and machine plumbing and also to the percentage of bad eggs in the lot. Results of those field trials are summarized in a letter from Roble to one of the present inventors dated May 18, 1988. A copy of that letter is attached and referred to as Reference #2.

Clearly, a means of controlling contamination in the egg injection process is necessary. One approach would be to incorporate exhaustive sanitization procedures throughout the hatchery and to cull out bad eggs from entering the process. However, this approach is not practical in the normal hatchery as it would be prohibitively expensive. Prior use of heat to sterilize the needle and egg penetration area proved to be a constant problem in plugging the needles with cooked albumin. Cleaning of the needles in a bath after each injection, as is done by some machines presently utilized, will not sterilize either the egg shell, injection solution or machine plumbing. Ultraviolet light has beneficial germicidal effects, but requires more time to kill bacteria than the injection process will allow.

Prior attempts to test the viability of injecting various vitamins, nutrients and trace minerals to enhance the embryo have not been successful because the results have been masked by the depression of hatch rates due to contamination.

More recent attempts to vaccinate chicken embryos against Marek's disease (MD) by injecting the live virus vaccines, turkey herpesvirus (HVT) and SB-1 strain, have shown promise for immunizing the hatched avian species, as disclosed in U.S. Pat. No. 4,458,630 issued Jul. 10, 1984 to J. M. Sharma, et al. However, the process described in Sharma does not address the impact of contamination in the normal commercial hatchery environment, and in actuality may promote introduction of harmful bacterial infestation through the use or the carrier, chicken embryo fibroblast (CEF) tissue culture. Periodic severe hatch depressions may be expected as with the other avian embryo injection methods previously discussed. The problem of controlling bacteria without killing the beneficial live-virus vaccine remains with the referenced prior art.

The present invention overcomes the problems in the prior art and advances the art with regard to improvements to hatchability and disease control in the egg injection process, as will be revealed in the following disclosure.

OBJECTS OF THE INVENTION

An object of the present invention is to provide an improved method for injecting beneficial formulations into avian hatchery eggs, in which contamination is minimized, thus improving hatch rates.

Another object of the invention is to provide an apparatus for injecting avian hatchery eggs, said apparatus incorporating means for reducing the incidence of contamination arising from the injection process.

Another object of the invention is to provide a carrier solution for nutrients and/or antibiotics to be injected into avian hatchery eggs, in which the carrier solution facilitates protection of the egg embryos from contamination during the injection process.

Another object of the invention is to provide an improved method and apparatus for injecting beneficial formulations into avian hatchery eggs which employs a novel carrier solution which effects sterilization of injection needles, other elements of the injection apparatus, and injection sites on the eggs, without degrading the effectiveness of the beneficial formulations.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of our exclusive rights and privileges in the invention by limited to details of the embodiments described. We do intend that equivalents, adaptations and modifications of the invention reasonably inferable from the description contained herein be included within the scope of the invention as defined by the appended claims.

SUMMARY OF THE INVENTION

Briefly stated, the present invention comprehends an egg injection contamination control means using a disinfecting carrier solution, and an egg injection method and apparatus which maximizes the usefulness of the contamination control means. Included in the invention are specific formulations of solutions which we have developed to enhance hatchability and disease control.

A key aspect of our invention is our discovery that vaccines effective in controlling mycoplasma melangridis (MM) a well as vitamins, nutrients and trace minerals effective in improving hatch rates can be successfully transported through the injection process in a carrier solution of ethanol and water.

The apparatus of this invention utilizes the disinfecting characteristics of the carrier solution in combination with a timed-pulse pumping means to disinfect the egg and prevent the spread of contamination from egg to egg. By controlling the timing of an impulse-mode peristaltic pump, the injection machine is made to dispense extra impulses of the injectant formulation, both while the needle is outside and inside the egg, for the purpose of sterile-washing the shell to be pierced, the penetration hole, and the needle walls.

Another important aspect of our invention relates to our discovery that the disclosed method and apparatus, using an alternate in-process solution mixing feature, provides precise, contamination-controlled transport and injection of live-virus vaccines into chicken embryos for control of MD in the hatched chick. The embryo's immunological response system is evoked unincumbered by cross-contamination using this discovery. Additional hatch improvements previously mentioned may be realized by the administering of vitamins and nutrients concurrently with the live virus. The end process carrier solution used for live-virus injection is also a solution of ethanol and water. Sufficient amounts of the live-virus survive the ethanol because of a special method of preparing the virus vaccine material, combined with its limited time exposure (less than two minutes typically) to the ethanol, dilution of the carrier solution taking place with the injected embryo's fluids. The special preparation method consists of suspending the virus cells in a very dilute (hypotonic) solution of sodium chloride, causing their osmotic characteristics to increase their size and provide a time-varying barrier to the ethanol. Concentrated salt solutions would cause the virus cells to lose water and shrink. Distilled water would cause the cells to swell and rupture.

To sanitize the egg shell without having to dispense live virus as part of the sterile wash, a separate spray jet of ethanol/water is administered by an auxiliary pump action.

The method and apparatus of the present invention are useful to the poultry industry's chicken and turkey hatchery operations. Moreover, the invention is applicable to both bottom-of-egg and top-of-egg injections. The beneficial injectable formulations and carrier solution concentrations vary for both settings and transfer injections, depending on specific conditions.

BRIEF DESCRIPTION OF THE DRAWINGS

FIG. 1 is a perspective view of one embodiment of an egg injection machine according to the present invention which injects eggs from their bottom or small end.

FIG. 2 is a perspective view of another embodiment of an egg injection machine according to the present invention which injects eggs from their top or large end.

FIG. 3 is a composite electrical and mechanical schematic diagram of the machines of FIGS. 1 and 2, which for convenience shows eggs oriented only for bottom injection.

FIG. 4 is a timing diagram illustrating the relative sequence of operations of the apparatus of FIG. 3.

FIG. 5 is a fragmentary view showing an alternate embodiment of part of the apparatus of FIG. 3.

FIG. 6 is a fragmentary view showing a second alternate embodiment of part of the apparatus of FIG. 3.

DETAILED DESCRIPTION OF THE INVENTION

Introduction

The present invention provides a method of egg injection with hatch-improving formulations. It also provides an apparatus and carrier solution for the formulations which maximizes the usefulness of the method and formulations. The invention is useful in any avian hatchery, but particularly in the high-volume turkey and chicken industry in which control of the hatch rates and infectious diseases is economically essential.

The method of egg injection disclosed herein evolved as a result of experimentation from many field trials at several typical high-volume turkey hatcheries. The key to the invention was the discovery that a mixture of ethanol and water could be used instead of pure distilled water as the carrier for the injectable materials in the egg injection process. Field trials were performed using formulations of injectable materials, such as d-Biotin (vitamin H), pyridoxine (vitamin B6), thiamine (vitamin B1), di-Tocopherol (vitamin E), riboflavin (vitamin B2), cupric sulfate (for copper trace mineral), Gerasol (gentamicin sulfate), and Tylusin (streptomycin), each mixed with a carrier solution of water and ethanol. Formulations were discovered which improved flock hatchability rate depending upon the deficiency of the eggs under test.

Mineral and vitamin deficiencies in the eggs are caused by the same deficiencies in the food provided to the hen or by the inability of the hen to pass on these materials. Since vitamins are organic compounds that the embryo is unable to synthesize, these deficiencies must be supplied by external means. By providing these minerals and vitamins, the growing embryo has improved blood production, improved maturation of its nervous system, and extra muscular stamina which facilitates its breaking out of its shell, thereby improving hatchability. The gentamicin and streptomycin primarily provide immunization to diseases encountered after hatch, but improved hatchability was also shown in eggs from flocks with known MM contamination.

The usefulness of this invention results from the facts that the carrier solution does not harm the injectable's food value or avian immunization characteristics, provides disinfecting action for the delivery system and localized egg injection site, has no significant negative influence on the embryo, and is or can be approved for the human food chain.

Additives of iodine and/or quaternary ammonium compounds may be used to enhance the disinfecting action. Other disinfecting solutions may be water/chlorine of about 500 ppm, water/quaternary of 65 ppm, or water/iodine of 10 to 15 ppm, each of which are sometimes used as sanitized drinking water. Alkalis in small proportions may also be used as disinfectant. The water/ethanol solution was found to be satisfactory for the process. A water/ethanol solution of 70 to 75 percent ethanol provides maximum disinfecting capability. Small percentages of ethanol, down to 50 percent, are useful in providing moderate disinfecting capability while maximizing the safe transport of the live virus vaccines.

Figure 3:
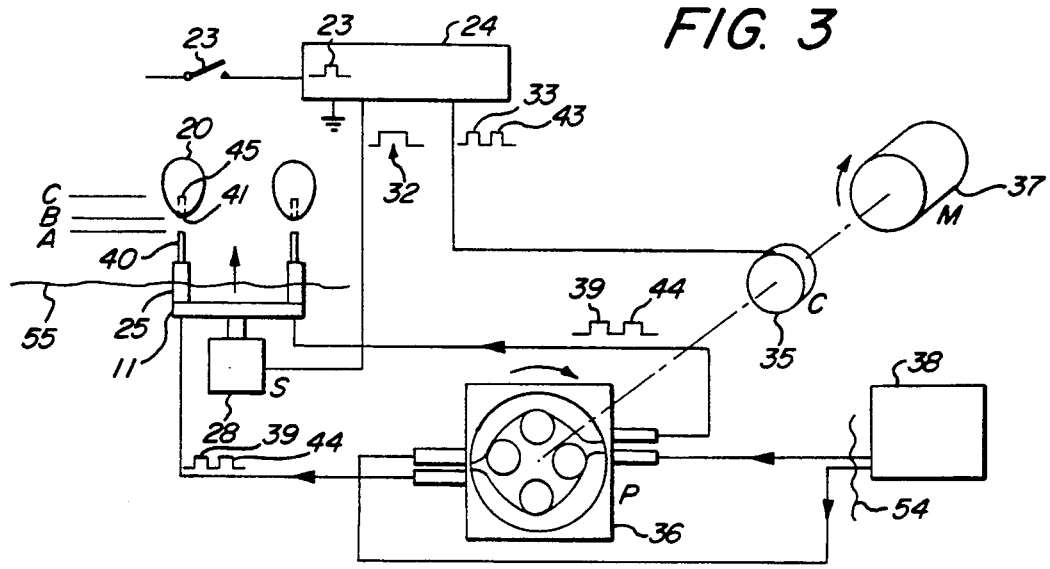
Figure 4:
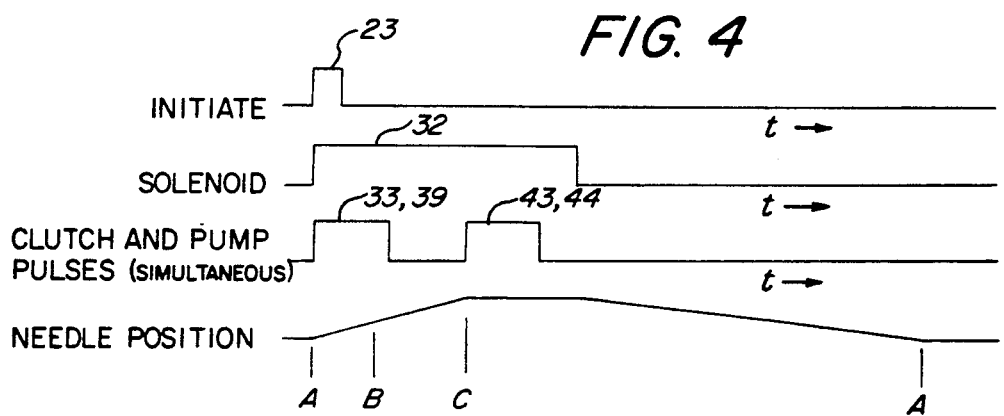

Egg injection machines according to the present invention were configured to have features which maximized the usefulness of the method, and beneficial injectable solutions were formulated as results of field trials. The machines incorporate a high speed peristaltic pump which operates in an impulse mode. It is actuated by engaging a constant speed motor to its shaft by an electrically operated clutch which is timed to operate in sequence with a needle-inject solenoid. This action provides a jet pulse of disinfectant to sterilize both the needle guide and the shell being pierced during the needle stroke. The pulse of disinfectant continues to sterilize the localized penetration hole as the needle progresses into the egg. Progression of the needle through its guide provides further sterilization of the needle. Thereby, all contacting elements of the injection process are sterile-washed through the properly timed actuations of the pump.

The invention provides a cost-effective contamination control means by eliminating the need for expensive and exhaustive procedures for sterilization of the eggs, machinery and injection fluids in secondary hatchery operations during the injection process.

Embryonal injections using the aforementioned formulations and apparatus are characterized by hatch rates typically greater than that of untreated eggs. Hatch improvements of 2.4 percent or more can be anticipated in commercial operations using optimized solution; potentially 10 to 15 percent hatch improvement capability is projected based on a typical hatch of 85 to 90 percent of fertile eggs in present turkey hatcheries.

The examples presented with this disclosure show the effectiveness of the invention and are not intended to limit the scope of the invention as defined by the claims.

Embryonal injections of HVT, SB-1, and other live-virus injections in which the virus cell may be made to survive the ethanol/water carrier are facilitated using an in-process solution mixing method. The method uses a mixing reservoir which allows mixing of all solutions just prior to injection. The benefits of inoculation of chicken embryos against Marek's disease is additive to the benefits of improved hatch due to bacterial control and to poult quality/growth rate due to the nutritional additives.

DESCRIPTION OF THE PREFERRED EMBODIMENTS

Referring now to FIG. 1, an egg injection machine (10) according to the present invention is illustrated in which eggs are injected from below. FIG. 2 illustrates an alternate embodiment 10A of machine 10 in which eggs are injected from above. Machines 10 and 10A are substantially similar in construction and operation, and therefore are described together where possible. Machine 10 includes a needle plate assembly (11), a stationary fixture plate (12), an egg tray holding assembly (13), and a pressure pad assembly (14). An egg tray (15) is shown inserted into tray holding assembly (13) which is constrained to move only in a vertical direction by guide rods (16), but normally biased at rest in an upwardly retracted position, by means of tray retraction springs (17) in machine 10, FIG. 1, and in a downward retracted position by the action of gravity in machine 10A, FIG. 2.

Pressure pad assembly (14) consists of a resilient pressure pad (18) mounted on a pivot frame (19). Pivot Frame 19 is pivotably mounted to bushings 19A, which are vertically slidably mounted over guide rods 16. Pressure pad assembly (14 is vertically slidable and pivotable with respect to tray (15), allowing closure upon an inserted tray 15 of eggs 20. A tension spring (22) biases pressure pad assembly 14 in an upright, non-contacting position with respect to tray (15). Upon closure, manual application of a downward directed force on pressure pad assembly (14) causes it to move vertically on guides (16) in unison with the egg tray (15) and tray holding assembly (13) until the eggs are seated against the stationary fixture plate (12) and the pressure pad (18) is suitably compressed against the eggs (20). To keep the eggs (20) from falling over in top-inject machine (10A), FIG. 2, as the pressure pad (18) lifts the egg tray (15) and its eggs (20), a resilient alignment pad (21), made, for example, from a foam rubber pad which has circular holes with spacing matching the center-to-center spacing of the eggs (20), is placed over the top of the eggs prior to closure of the pressure pad assembly (14). Retraction springs (17) and (22) assist the opening of pressure pad assembly (14) of machine (10) of FIG. 1, but gravity provides this function in machine (10A), FIG. 2.

In the closed position of the pad assembly (14), the timing cycle of FIG. 4 is activated by a switch (23), FIG. 3. Closure of switch (23) initiates a timing sequence in timing sequencer (24) which sends electrical current pulses 32) and (33) to solenoid (28) and pump clutch (35) respectively. Solenoid (28) is activated by electrical pulse (32) simultaneously with activation of a peristaltic pump (36) by the application of electrical pulse (33) to clutch (35) which mechanically couples motor (37) to pump (36). Pump (36) has inlet ports connected by tubing to a fluid reservoir (38), and outlet ports connected to the needle assemblies (25).

On the opposite side of the stationary fixture plate (12) from the tray (15) of eggs (20) is located the needle plate assembly (11) which moves vertically on guide rods (34). The needle plate assembly (11) includes needle assemblies (25), tubing (26), and needle plate base (27).

A solenoid (28) is mounted on the stationary base (12B) of fixture plate (12), as shown in FIGS. 1 and 2, and its push rod (29) is suitably attached to needle plate assembly (11).

Activation of solenoid (28) by switch (23) causes needle plate assembly (11) to accelerate rapidly from position A, FIGS. 3 and 4, toward the eggs (20). The needle plate assembly (11) is guided by vertical guide rods (34) mounted to the stationary plate assembly (12). Simultaneously, a first pulse of fluid (39) is ejected out of needles (40) causing sterile washing of the egg's outer surface (41) and of needle guide holes (42) in stationary plate (12). Needles (40) have a perpendicularly truncated tip. As disclosed in our U.S. Pat. No. 4,040,388, we discovered that needles of that shape were much less likely to damage eggs than conventionally shaped hypodermic-type needles, which have an obliquely truncated, tapered point.

Just after the needles have penetrated the egg at position B, FIGS. 3 and 4, shock absorbers (30) make contact with needle plate (27) and begin to slow its speed and cushion its stop at the end of travel, position C, FIG. 3. At or near the end of travel of the needle plate (27) a second timed electrical pulse (43) to pump clutch (35) causes a second pulse of fluid (44) to be injected at a predetermined position (45) within the egg. As many secondary pulses as desired may be preset into the timing sequencer (24), thereby varying the dosage.

Figure 2:
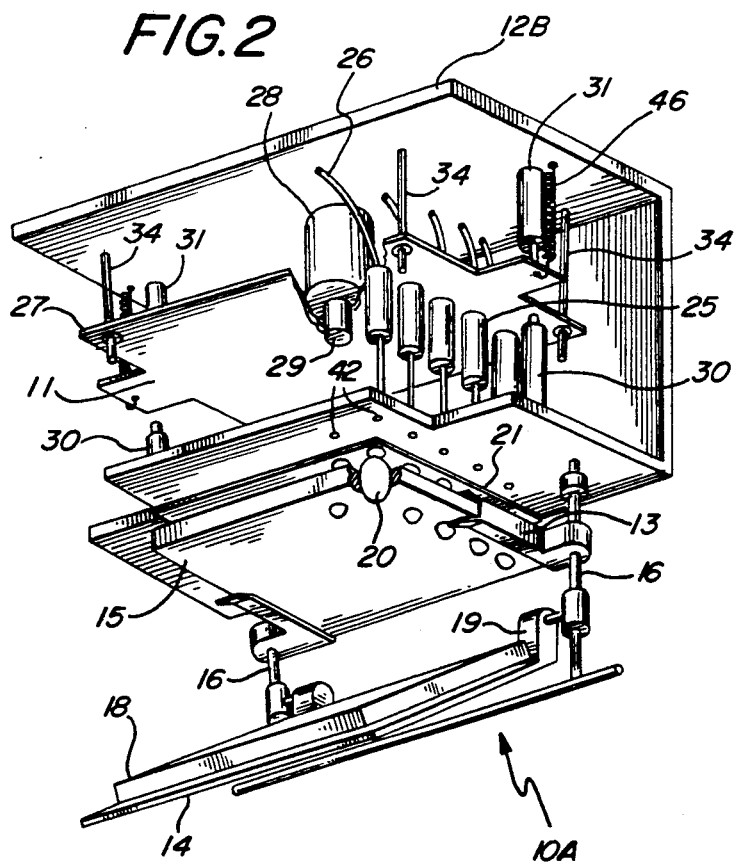

At the end of fluid injection the solenoid pulse (32) applied to Solenoid (28) is terminated by the timing sequencer, thus allowing needle plate (11) to return to its original position In machine (10), FIG. 1, the return is accomplished by gravity and in machine (10A), FIG. 2, return is accomplished by springs (46). At the end of return travel another set of shock absorbers (31) cushion the stop of needle plate (11).

Two sets of shock absorbers (30) and (31) are mounted on the stationary fixture plate assembly (12) to cushion the end of travel of the needle plate assembly (11) in either direction.

After injection and return of machine elements to a rest position, eggs (20) may be removed by sliding the tray (15) out of the tray holding fixture (13). The machine is then ready for another cycle.

It should be noted that the only operational difference between machine (10), FIG. 1 and machine (10A), FIG. 2 is that the special resilient alignment pad (21) is placed over the top-inject eggs of machine (10A) prior to tray insertion, and then removed after tray extraction from the machine.

Figure 5:
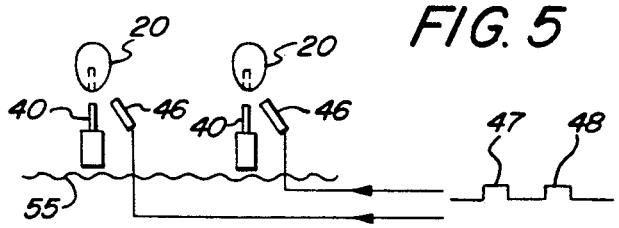

FIG. 5 illustrates an alternate embodiment of the apparatus of FIG. 3 which employs a separate spray means (46) for washing the egg shell using an auxiliary pumping system. The pump is not shown but its pulses (47) and (48) are timed respectively, to first sterile-wash the shell (20) prior to penetration of the shells by the injection needles, and then to sterile-wash the needle (40) as it exits the shell. Break (55) shows the point of application of the spray means (46).

Figure 6:
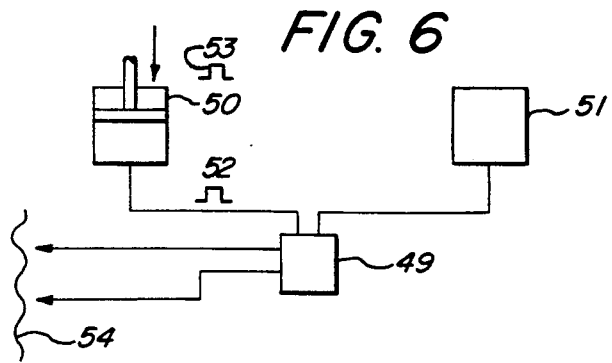

FIG. 6 shows another alternate embodiment of the apparatus of FIG. 3 which employs an alternate in-process mixing reservoir (49) and a live-virus metering reservoir (50) which provides metering of an ethanol/-water sterilizing solution in reservoir (51) with the live-virus solution. The metering pulse of the live-virus solution (52) is applied by timed pulse (53) of its application pump (not shown) in proportion to the pumped flow (44) of the injected mixture. Break (54) shows one point of application of the alternate in-process mixing means.

A separate fluid circuit could be connected to peristaltic pump (36) and used to mix fluids from reservoirs (50) and (51), if desired.

EXAMPLES

Fertile turkey hatchery eggs were selected from production flocks for the purpose of performing field trials of the herein disclosed method and apparatus for improving hatchability and disease control. To minimize statistical variance, precautions were taken to select both test and control eggs from the same flock and from the same grouping as arrived from the farm, to select incubators for the test that historically showed equivalency in hatch rate, and to place both the test eggs and control eggs together in the same process flow, except that control eggs were not injected. Eggs were randomly mixed within groupings.

The tests were preformed over a period of more than one year, thereby allowing tests of eggs from new flocks, average age flocks, old flocks, and flocks which tested positive for MM. Tests were performed at two commercial hatcheries with standard sanitation controls. None of the eggs were otherwise treated by vacuum dipping in solutions of Garasol or Tylusin as is sometimes practiced in the industry.

The volume of solution injected into each egg in the following Tables I through VI was 0.035 milliliter. The amount of beneficial injectables injected per egg as part of this volume is documented in the Tables.

The twelve examples of Tables I through IV were performed by injecting into the embryo at transfer time through the small (bottom) end of the shell and with the needle extending 0.20 inch into shells. These eggs were then wax-sealed in a shallow wax bath and then transferred to hatching bins. Transfer time, defined as the time of transfer from incubator to hatching bins, was typically at the twenty-fourth to twenty-fifth day after incubation setting. This is in the final seventh of the twenty-eight day incubation period.

The three examples of Table V and VI were performed by injecting solution into the amniotic fluid at setting time through the small end of the shell and with the needle extending 0.20 inch into the shell. These eggs were then wax-sealed in a shallow wax bath and then set into incubators.

The examples and their results are explained in detail in the following.

TABLE I

| | | (Injections at Transfer) | | | | | |
|---|---|---|---|---|---|---|---|
| Example[1] | Carrier Solution | Injectable: d-Bioten micro gm. | Vaccine | Flock age (wks) | Controls quantity (% hatch) | Injected quantity (% hatch) | % Hatch Improvement |
| 1 | 70% Ethanol | 11.48 | none | 10 | 819 (87.55) | 544 (88.97) | 1.42 |
| 2 | Saline | 11.48 | none | | | 544 (89.34) | 1.74 |

TABLE II

| | | (Injections at Transfer) | | | | |
|---|---|---|---|---|---|---|
| Example[1] | Injectable: d-Bioten micro gm. | Vaccine: Garasol milli gm. | Flock age (wks) | Controls quantity (% hatch) | Injected quantity (% hatch) | % Hatch Improvement |
| 3 | 11.48 | 0 | 6 | 1020 (85.78) | 544 (86.03) | 0.25 |
| 4 | 11.48 | 0.22 | | | 544 (88.24) | 2.46 |
| 5 | 11.48 | 0.20 | 10 | 2090 (86.32) | 983 (88.71) | 2.39 |
| 6 | 11.48 | 0.30 | | | 983 (85.55) | −0.77 |
| 7 | 11.48 | 0 | 25+ | 3428 (72.43) | 544 (73.76) | 5.33 |
| 8 | 11.48 | 0.73 | | | 544 (77.53) | 1.10 |

TABLE III

| | | | | (Injections at Transfer) | | |
|---|---|---|---|---|---|---|
| Example[1], [2] | Injectable: d-Bioten micro gm. | Vaccine: Garasol milli gm. | Flock age (wks) | Controls quantity (% hatch) | Injected quantity (% hatch) | % Hatch Improvement |
| 9 | 3.8 | 0 | 2 | 1851 (84.44) | 544 (78.49) | −5.95[2] |
| 10 | 3.8 | 0.51 | | | 544 (84.74) | 0.30 |

[1]Examples 9 and 10 used a carrier solution of 70% Ethanol and 30% DiWater.
[2]Flock was known to have high positive MM test results.

TABLE IV

| | | | | (Injections at Transfer) | | |
|---|---|---|---|---|---|---|
| Example[1] | Injectable: d-Bioten micro gm. | Vaccine: Garasol/Tylusin milli gm. | Flock age (wks) | Controls quantity (% hatch) | Injected quantity (% hatch) | % Hatch Improvement |
| 11 | 5.1 | 0.306/0.153 | 20 | 1869 (89.41) | 1088 (89.71) | 0.30 |
| 12 | 5.1 | 0.306/0.459 | | | 1088 (89.52) | 0.11 |

[1]Examples 11 and 12 used a carrier solution of 70% Ethanol and 30% DiWater.

TABLE V

| | | | (Injections at Setting) | | | |
|---|---|---|---|---|---|---|
| Example[1] | Injectable: d-Bioten/Vit. E/Vit. B1 micro gm/micro ml/micro gm | Vaccine: Garasol milli gm. | Flock age (wks) | Controls quantity (% hatch) | Injected quantity (% hatch) | % Hatch Improvement |
| 13 | 11.47   0    11.47 | 0.20 | 20 | 1397 (82.11) | 3885 (80.54) | −1.57 |
| 14 | 11.47   0.51   11.47 | 0.20 | | | 3743 (82.34) | 0.23 |

[1]Examples 13 and 14 used a carrier solution of 70% Ethanol and 30% DiWater.

TABLE VI

| | | | (Injections at Setting) | | | |
|---|---|---|---|---|---|---|
| Example[1] | Injectable: d-Bioten/Vit. E/Vit. B1/CuSO4 micro gm/micro ml/micro gm/micro gm | Vaccine: Garasol milli gm. | Flock age (wks) | Controls quantity (% hatch) | Injected quantity (% hatch) | % Hatch Improve. |
| 15 | 11.47   0.51   11.47   1.15 | 0.20 | 24 | 13,072 (84.67) | 2244 (86.96) | +2.29 |

[1]Example 15 used a carrier solution of 70% Ethanol and 30% DiWater.

EXAMPLES 1 AND 2

Test Examples 1 and 2 of Table I show the results of injection tests at transfer time using a 70% ethanol, 30% water solution with d-Biotin (vitamin H), compared to injection of d-Biotin in a carrier solution consisting solely of purified saline water. Both test samples (544 eggs each) and control samples (819 eggs) were pulled from the same flock. The test results show that the ethanol had no significant negative influence on the embryo The hatch improvements of +1.42% and 1.74% are attributed to the added vitamin H. No significant contamination existed in this flock's eggs as evidenced by the hatch improvement, and therefore lack of process cross-contamination, using saline as the carrier. However, the efficacy of the ethanol as a carrier is demonstrated.

The examples of all subsequent tests, all of which were run without live-virus vaccines, use 70% ethanol and the balance water, as the carrier.

EXAMPLES 3 AND 4

Test examples 3 and 4 of Table II were performed at transfer and demonstrate that by adding the MM vaccine Garasol to the ethanol, water, and d-Biotin solution an improvement in hatch of +2.46% over that of uninjected control eggs was obtained. This particular test would indicate that some MM was present in the eggs, as evidenced by the lesser hatch improvement of +0.25% without the vaccine.

EXAMPLES 5 AND 6

Test examples 5 and 6 of Table II were performed at transfer and demonstrate that too much Garasol can depress the hatch and that 0.20 milligram per egg is better than 0.30 milligram per egg.

EXAMPLES 7 AND 8

Test examples 7 and 8 of Table II continue to demonstrate positive hatch improvements with injections at transfer. This was the oldest of all flocks at 25+ weeks of age. They showed a significant improvement in hatch, +5.33%, due to the added d-Biotin, indicating a vitamin deficiency in the flock. Again, high levels of Garasol in example 8 compared to that of example 7 showed a lesser improvement in hatch. This is not to rule out use of high levels of Garasol vaccine since its major benefits are not seen until after the hatched poult emerges and is exposed to further infectious diseases.

EXAMPLES 9 AND 10

Test examples 9 and 10 of Table III were performed at transfer and demonstrate the results of the addition of Garasol to the ethanol, water, and d-Biotin (reduced to 3.8 mg.) solution when the eggs came from a flock which is known to have high positive MM test results. Without Garasol, a depression or −5.95% was recorded. Addition of Garasol brought the results to a positive +0.30%. It is known that the ethanol alone has little effect on MM, therefore the most beneficial formulation must contain Garasol to suppress the MM cross-contamination in the egg injection process. Ethanol works well in suppressing the other hatchery bacteria. Therefore, a combination formulation is desireable.

EXAMPLES 11 AND 12

Test examples 11 and 12 of Table IV were performed at transfer for the purpose of determining if a combination of Garasol and Tylusin could be injected, thereby providing a wider range of disease inoculation. Positive test results indicate this is possible, reference the improvements of +0.30% and +0.11%. The smaller amount of Tylusin, 0.15 milligram per egg, is better for hatchability. Additional tests to more closely select formulations were not needed to prove the efficacy of the discovery.

EXAMPLES 13 AND 14

Test examples 13 and 14 of Table V were performed at setting by injection into the amniotic fluid. Example 13 used a formulation of d-Biotin, thiamine (B1) and Garasol in the 70% ethanol, 30% water carrier. A hatch depression of −1.57% occurred. Concurrently, test example 14 was performed on the same grouping of eggs but with vitamin E added to the formulation resulting in a +0.23% improvement in hatch. This would indicate that the flock was deficient in vitamin E, but not necessarily deficient in d-Biotin or thiamine.

EXAMPLE 15

Test example 15 of Table VI was performed at setting by injection into the amniotic fluid and is identical to example 14 except that cupric sulfate is added for trace copper mineral, and the flock is different and older. A significant hatch improvement of +2.29% was recorded, demonstrating the efficacy of the formulation of d-Biotin, thiamine (B1), vitamin E, copper, and the vaccine Garasol with the carrier 70% ethanol and 30% water. This test result tends to verify that a multiplicity of nutrients and minerals are needed to ensure meeting all possible deficiencies.

TEST SUMMARY

The efficacy of the 70% ethanol, 30% water disinfectant carrier solution is demonstrated by summation of all results which show no general hatch depressions from egg contamination by the injection process. The disclosed invention overcomes the hatch depressions due to egg injection as experienced by the hatchery industry since 1980 and by the USDA tests. ARA #58-32U4-M-568, of 1988. Additionally, introduction of beneficial materials improved the hatch, relative to controls, from +2.46% (test example number 4) to +5.33% (test example number 7) for transfer injection and to +2.29% (test example number 15) for setting injection.

The test results substantiate the following claims of a method for increasing hatchability and improving the egg injection process, an effective carrier solution, and an apparatus which takes advantage of the carrier solution's disinfectant properties in overcoming the problem of depression from cross-contamination experienced by machines of the prior art.

What is claimed is:

1. A method for increasing the hatchability of avian hatchery eggs and for improving the process of automatic injection of said eggs in the control of disease of viral, bacterial, and microbial types, wherein said eggs are injected with beneficial formulations of vaccines, vitamins, nutrients, and trace minerals, said method comprising forming a mixture of said formulations with an injectable disinfectant contamination control carrier solution effective in preventing contaminants from entering said egg during the injection thereof, applying said solution to an intended injection site of the shell of said egg prior to injection of said mixture, and injecting said mixture directly and invasively into developing embryos of said egg during the incubation period thereof, or into the amniotic fluid supporting said embryos prior to setting said eggs into an incubator.

2. A method as in claim 1 wherein said contamination control carrier solution is a disinfectant to viral, bacterial, or microbial contamination to which the embryo is susceptible but which carrier solution has no negative influence on either embryo or the said beneficial injectable materials and is approved for the human food chain.

3. A method as in claim 2 wherein said contamination control carrier solution is compromised of approximately 70% ethanol and the balance being water into which the beneficial injectables are mixed into solution.

4. A method as in claim 1 wherein said disease is further defined as mycoplasma melangridis and the said other contaminations controlled by the carrier solution are bacteria of the type customarily found in the hatchery environment.

5. A method as in claim 1 wherein said disease is Marek's disease in chickens.

6. A method as in claim 1 wherein said beneficial formulations are injected into avian embryos during the final seventh of the incubation period which is approximately the seventeenth or eighteenth day for chickens and approximately the twenty-fourth or twenty-fifth day for turkeys.

7. A method as in claim 6 wherein said beneficial formulation is comprised of the vaccines Garasol and/or Tylusin the vitamin d-Biotin, and the said contamination control carrier solution.

8. A method as in claim 6 wherein said beneficial formulation is injected into chicken embryos and is comprised of the vaccines HVT, SB-1 or other live-cell structured virus mixed in-process with said contamination control carrier solution; said live cells being suspended in a dilute (hypotonic) solution prior to mixing.

9. A method as in claim 8 wherein said dilute solution is sodium chloride.

10. A method as in claim 1 wherein the said embryos are injected through the small end of the shell.

11. A method as in claim 1 wherein the said embryos are injected through the large end of the shell.

12. A method as in claim 1 wherein said beneficial formulations are injected into the avian eggs prior to setting the eggs into the incubator.

13. A method as in claim 12 wherein said beneficial formulation is comprised of the vaccines Garasol and/or Tylusin, the vitamins d-Biotin (H), thiamine (B1), and di-tocopherol (E), the trace mineral copper and the said contamination control carrier solution.

14. A method as in claim 12 wherein the said eggs are injected through the small end of the shell into the amniotic fluid.

15. A method as in claim 12 wherein the said eggs are injected through the large end of the shell.

16. A method as in claim 12 wherein the injection hole is sealed by a thin wax coating.

17. An egg injection machine with an injectant delivery system which utilizes the disinfectant properties of a contamination-control injectant carrier solution to provide sterilization of the injectant delivery system and localized egg injection site, and wherein the egg injection machine delivers contamination-free beneficial injectables into the hatchery egg; said machine comprising:

(a) means for positioning a plurality of eggs arranged in a tray directly coincident with a corresponding plurality of hollow injection needles;
(b) means for advancing said needles into said eggs;
(c) means for pulsing a jet of disinfectant solution toward said eggs, thereby sterile-washing elements of said machine and eggs at the localized injection site prior to penetration of said needles into said eggs;
(d) means for producing pulses of injectant carrier solution through said needles;
(e) timing means for generating timed production of said pulses of said disinfectant solution and said injectant solution in synchronism with said advancement of said needles;
(f) means for decelerating said needles after the shells of said eggs have been pierced; and
(g) means for withdrawing said needles from said eggs.

18. The machine of claim 17 wherein said hollow injection needles have a perpendicularly truncated tip.

19. The machine of claim 18 wherein said needles are further defined as having a round cross-sectional shape.

20. An egg injection machine according to claim 18 wherein said means for advancing and retracting said needles comprises a vertically movable needle injection plate.

21. An egg injection machine according to claim 20 wherein said needle injection plate is driven by a linear actuator.

22. An egg injection machine according to claim 21 wherein said linear actuator is further defined as being a solenoid.

23. The machine of claim 17 wherein said disinfectant solution is ejected from said needles.

24. The machine of claim 17 wherein means for sterile washing the egg shell's penetration area and the needle's exterior surface area comprises a separate spraying system for applying said disinfectant solution.

25. An egg injection machine according to claim 24 wherein said alternative sterile washing means is a separate set of fixed spray jets aligned toward the injection site so as to apply disinfectant solution to the shell and injection needles in a sequence times to coincide with the injection stroke.

26. The egg injection machine of claim 17 wherein the composition of said contamination-control injectant carrier solution is approximately 70%, plus 10%, minus 20% ethanol, with the balance being water.

27. An egg injection machine according to claim 17 wherein said means for positioning said eggs comprises a stationary fixture plate and locator stops in an egg tray holder assembly which provide precise egg-to-needle alignment upon positioning of the egg tray against said locator stops.

28. An egg injection machine according to claim 17 wherein said means for producing pulses of said disinfectant solution prior to said needle penetration and said injectant solution is provided by the impulse action of a pump.

29. An egg injection machine according to claim 28 wherein said pump is further defined as being a peristaltic pump, momentarily coupled to a continuously operating motor by electrically energizing a momentary clutch in response to a timing sequencer.

30. An egg injection machine according to claim 17 wherein said means for generating timed pulses of injectant solution comprises an electrical timing sequencer whose first output signal electrically initiates, in approximate simultaneity, said needle plate drive solenoid and pump clutch.

31. An egg injection machine according to claim 17 wherein said means for decelerating said needle injection plate includes a shock absorber which is set to engage said needle injection plate as said needles enter said eggs.

32. An egg injection machine according to claim 17 wherein said means for withdrawing said needles includes deactivation or said advancing means so that a spring, or gravity, and a shock absorber system can return said needle plate softly to its original position.

33. A method for increasing the hatchability and control of viral, bacterial, or microbial diseases in avian specie hatchery eggs comprising the steps of:

(a) preparing a formulation of beneficial injectable materials in an aqueous contamination control carrier solution,
(b) placing a tray containing eggs into a tray holder assembly for alignment coincident with strokes of a plurality or hollow injection needles,
(c) initiating a timed sequence of needle drive and pump energization which sterile-washes the egg shell and injectant delivery system and, at the end of said needle strokes, delivers through said needle into a corresponding egg a measured amount of beneficial formulation, and
(d) retracting said needles from said eggs.

34. The method of claim 33 wherein the tips of said hollow injection needles have a perpendicularly truncated end.

35. The method of claim 33 further including the step of sealing of the injection site of each egg to ensure against subsequent embryo contamination.

36. The method of claim 35 wherein said sealing step comprises applying wax sealant to said injection site.

37. An injectable liquid for conveying nutrients and/or antibiotics by invasive injection directly into the embryo or amniotic fluid of a fertilized egg, said liquid including, a live-virus vaccine suspended in a carrier solution having disinfectant properties effective in preventing contaminants from entering said egg during the injection thereof, when applied to the intended injection site of the shell of said egg prior to injection, said carrier solution comprising a mixture in the range of 50%, to 80% ethanol, and a balance of water.

* * * * *